(12) United States Patent
Jeong et al.

(10) Patent No.: US 7,065,295 B2
(45) Date of Patent: Jun. 20, 2006

(54) APPARATUS FOR DRIVING LENS IN CAMERA

(75) Inventors: Yeong-hyo Jeong, Suwon (KR); Seong-ho Hwang, Suwon (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 10/823,556

(22) Filed: Apr. 14, 2004

(65) Prior Publication Data

US 2004/0247306 A1    Dec. 9, 2004

(30) Foreign Application Priority Data

Jun. 3, 2003    (KR) ...................... 10-2003-0035764

(51) Int. Cl.
*G03B 3/10* (2006.01)
(52) U.S. Cl. .......................... 396/85; 396/144
(58) Field of Classification Search ................ 396/72, 396/85, 144; 359/819, 822, 823, 824, 826, 359/829
See application file for complete search history.

(56) References Cited

U.S. PATENT DOCUMENTS

| | | |
|---|---|---|
| 5,748,394 A | 5/1998 | Shimazaki et al. |
| 6,434,334 B1 | 8/2002 | Ichinokawa |
| 6,570,717 B1 * | 5/2003 | Tu et al. ..................... 359/696 |
| 6,654,557 B1 * | 11/2003 | Kikuchi et al. ............. 396/144 |
| 2005/0168847 A1 * | 8/2005 | Sasaki ........................ 359/823 |

FOREIGN PATENT DOCUMENTS

| | | |
|---|---|---|
| JP | 05-341169 | 12/1993 |
| JP | 08-248284 | 9/1996 |

* cited by examiner

*Primary Examiner*—W. B. Perkey
(74) *Attorney, Agent, or Firm*—Roylance, Abrams, Berdo & Goodman, L.L.P.

(57) ABSTRACT

An apparatus for driving a lens in a camera includes a lens module installed in a reciprocating and sliding manner in an inside of a lens barrel, a lead screw installed on the lens barrel, for being rotated by a driving motor, and a power transferring member assembled on the lens module and equipped with a tooth-shaped part that corresponds to a tooth shape of the lead screw. The lens module has a lens and a slider having a mounting unit for mounting the lens and receiving the power transferring member in a movable manner. The mounting unit has a through groove in which one end of the power transferring member is fit and supported and a slit groove in which the other end of the power transferring member is fit to be supported for being movable in a direction perpendicular to the movement direction of the slider.

11 Claims, 4 Drawing Sheets

APPARATUS FOR DRIVING LENS IN CAMERA

CROSS-REFERENCE TO RELATED APPLICATIONS

This application claims the benefit of Korean Patent Application No. 2003-35764 filed Jun. 3, 2003 in the Korean Intellectual Property Office, the disclosure of which is incorporated herein by reference in its entirety.

BACKGROUND OF THE INVENTION

1. Field of the Invention

The present invention relates to an apparatus for driving a lens in a camera.

2. Description of the Related Art

Generally, a video camera, a digital still camera, a monitoring camera have an optical apparatus for taking a photograph of an image. Among them, a lens module for performing functions of focusing and/or zooming a target image is installed in a movable manner on a lens barrel. The lens module is reciprocated in the inside of the lens barrel by a predetermined driving force.

For such reciprocating motion, a guide shaft is installed within the lens barrel, and a slider equipped with a zoom lens and/or a focusing lens is installed in a sliding manner on the guide shaft. In addition, a driving motor and a lead screw for reciprocating the slider are installed on the lens barrel. The slider has a power transferring member having a tooth-shaped part for joining to a screw thread of the lead screw on it. The power transferring member is assembled to the slider by a separate part and connected to the lead screw.

However, recently, as light-weight and compact-sizing trends are pursued, the lens barrel, the driving motor and the lead screw are getting smaller in their sizes as well as the lens module. Particularly, as the trend of pursuing accuracy and low power consumption develops for the driving motor and the lead screw, high part accuracy is required. Therefore, if there is an assembling error of the lead screw with respect to the lens barrel, or an assembling error of the power transferring member, connection of the lead screw and the power transferring member may not be smoothly performed. In that case, the tooth-shaped part of the power transferring member may deviate beyond the allowable error range with respect to the axial direction of the lead screw. Accordingly, a big load is applied on the driving motor and big frictional force is applied on the lead screw, so that excessive noise may be generated or normal operation may not be performed.

SUMMARY OF THE INVENTION

The above disadvantages are overcome and other advantages are realized by embodiments of the present invention. Embodiments of the present invention comprise a lens module slidably installed in a lens barrel and a lead screw rotatably installed in the lens barrel. The lead screw is preferably rotated by a driving motor. A power transferring member is assembled on the lens module. The power transferring member comprises a tooth shaped part corresponding to the lead screw. The lens module comprises a mounting unit adapted to movably receive the power transferring unit. The mounting unit preferably comprises a through groove adapted to receive a first end of the power transferring member, which is preferably conical in shape. The mounting unit further preferably comprises a slit groove adapted to receive a second end of the power transferring member. The slit groove preferably has a first slit part having a small width and a second slit part having a larger width. The second end of the power transferring member preferably has a cross section having a first width corresponding to the width of the first slit part and a second width corresponding to the width of the second slit part. The power transferring member is preferably rotatably about a longitudinal axis such that the second end is movable through the first slit part in a first orientation, but not movable through the first slit part in a second orientation.

BRIEF DESCRIPTION OF THE DRAWINGS

The above objects and other advantages of the present invention will be more apparent from the following detailed description when taken in conjunction with the accompanying drawing figures, in which.

It will be understood that in the drawings, like reference numerals refer to like features and structures.

DETAILED DESCRIPTION OF THE PREFERRED EMBODIMENTS

Hereinafter, a preferred embodiment of the present invention will be described in detail with reference to the accompanying drawing figures.

The matters defined in the description such as a detailed construction and elements are provided to assist in a comprehensive understanding of the invention. Thus, it should be understood that the description contained herein is intended to be exemplary, and is not intended to include every possible embodiment of the present invention. Also, well-known functions or constructions are not described in detail in order to focus on the novel aspects of the herein described embodiments.

Figure 1:
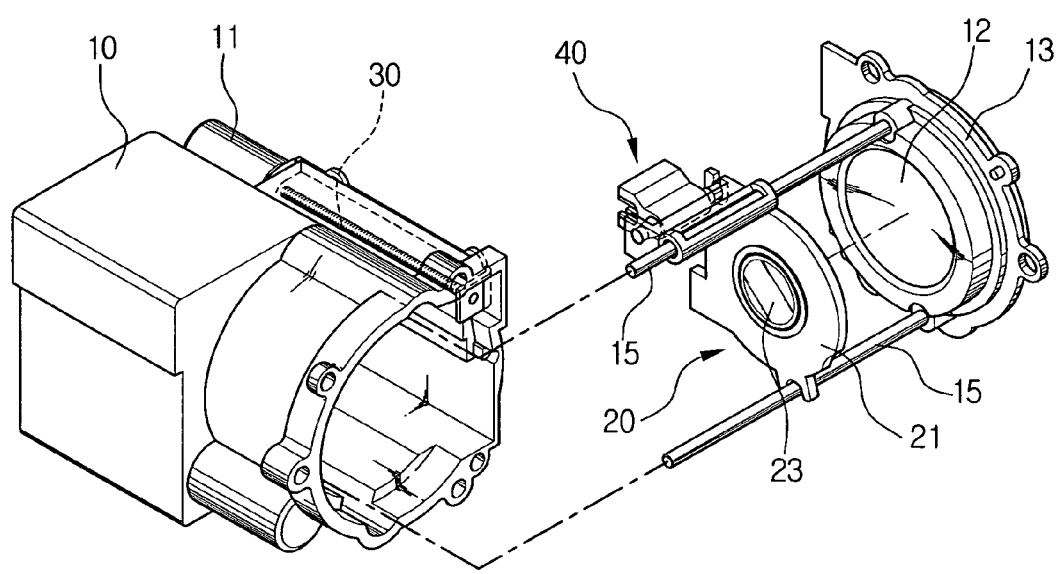
FIG. 1 is a separated, perspective view showing an apparatus for driving a lens in a camera according to an embodiment of the present invention.

Referring to FIG. 1, an apparatus for driving a lens in a camera according to an embodiment of the present invention includes a lens module 20 installed in a sliding manner in an inside of a lens barrel 10, a lead screw 30 installed on the lens barrel 10, and adapted to be rotated by a driving motor 11, and a power transferring member 40 assembled with the lens module 20, connected to the lead screw 30 by teeth adapted to engage the threads of the lead screw 30.

The lens barrel 10 is installed within a main body of a camera (not shown). In the inside of the lens barrel 10, a focusing lens for focusing a target image to be photographed and a zoom lens are installed in a movable manner. Also, at the end of the barrel 10 in a photographing direction of the lens barrel 10, a group of lenses including an object lens 12 is joined to a barrel cover 13. In the inside of the lens barrel 10 a guide shaft 15 for guiding movement of the lens module 20 is installed. In the presently described embodiment, the guide shaft 15 is fit into the inside of the lens barrel 10 and is also joined to the barrel cover 13.

Figure 2:
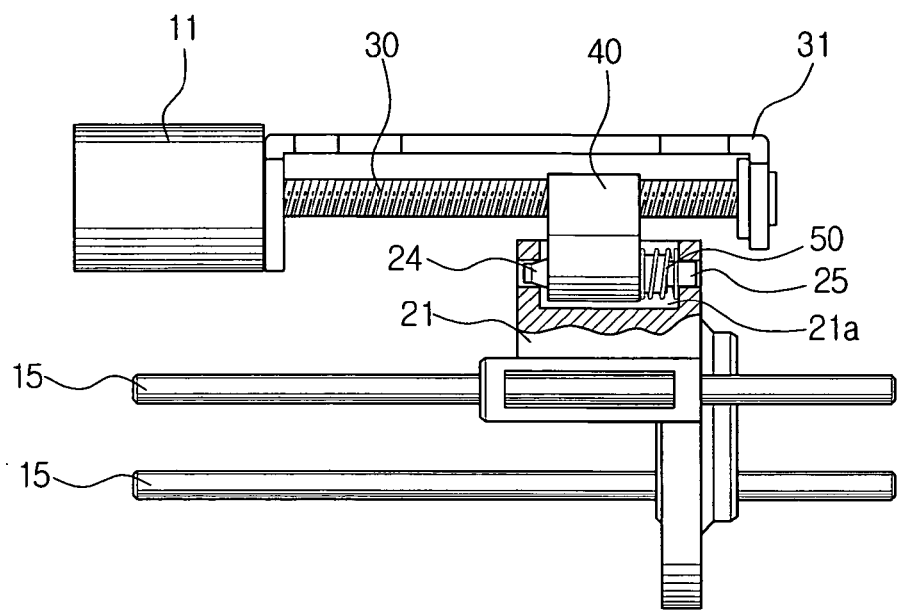
FIG. 2 is a side view showing an extract of a portion of FIG. 1.
Figure 3:
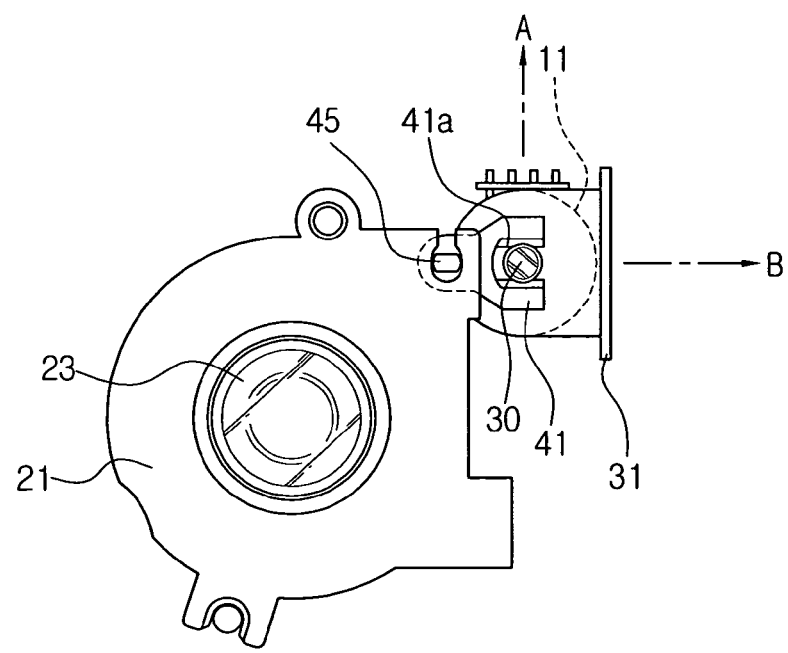
FIG. 3 is a front view of the portion illustrated in FIG. 2.

Referring to FIG. 2 and FIG. 3, the lens module 20 includes the focusing lens or the zoom lens and is installed movably within the lens barrel 10. In the present embodiment, the lens module 20 has a slider 21 supported in a sliding manner on the guide shaft 15 and a zoom lens 23 supported by the slider 21. The slider 21 has a mounting unit 21a for supporting the power transferring member 40 in a movable manner. The mounting unit 21a will be described in further detail below.

The lead screw 30 is rotatably supported by a supporting bracket 31 joined to the lens barrel 10, and has a screw thread on its outer periphery. On the supporting bracket 31, a driving motor 11 is supported. The lead screw 30 is exposed to the inside of the lens barrel 10 and arranged in parallel with the guide shaft 15. Thus, the slider 21 is able to move along the direction of the lead screw 30 and the guide shaft 15.

Figure 4:
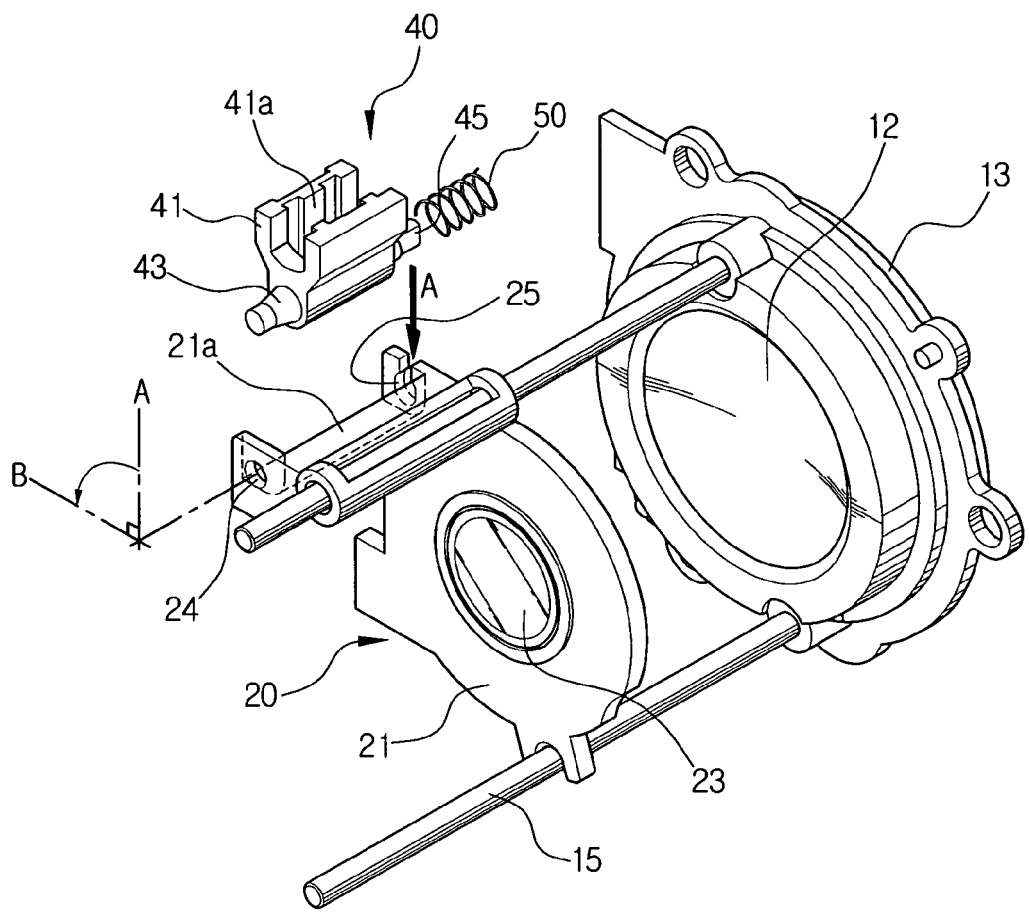
FIG. 4 is a separated, perspective view showing an extract of a portion of FIG. 1.

While being assembled to the slider 21, the power transferring member 40 is joined to the lead screw 30 in a tooth combining manner. Therefore, upon rotation of the lead screw 30, the power transferring member 40 is moved to the axial direction of the lead screw 30 along the lead screw 30, and finally the slider 21 can be moved. Referring to FIG. 4, such power transferring member 40 has a tooth-shaped part 41 into which the lead screw 30 is fit and joined in a tooth combining manner. The power transferring member 40 further has a first axis 43 of a conical cross-section on its one end, and a second axis 45 of a non-circular cross section on its other end.

The tooth-shaped part 41 preferably has a U-shape whose upper part is open, and a rib 41a adapted to be joined to the lead screw 30 in a tooth combining manner formed in the inside of the U-shape. The lead screw 30 is fit in and connected with the power transferring member 40 through the upper open part of the tooth-shaped part 41. The first axis 43 is of a conical shape which is tapered in its one end. The second axis 45 is of a non-circular cross section. Preferably, the second axis 45 has a cross section having short width and long width whose widths are different from each other.

Figure 5:
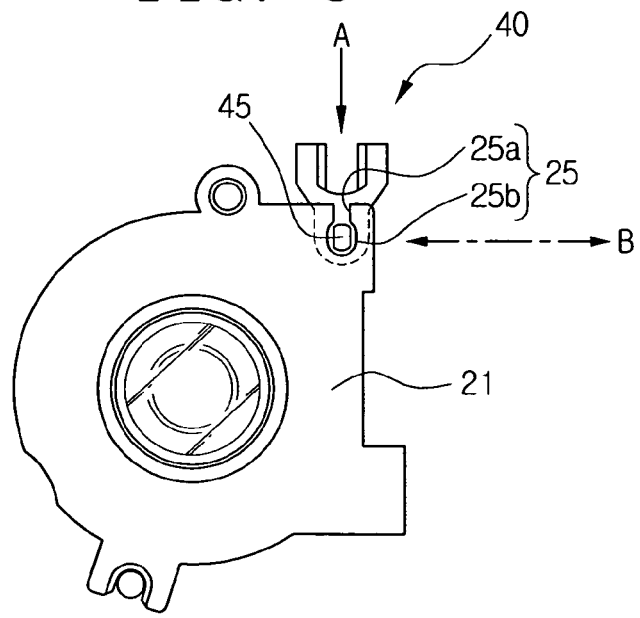
FIG. 5 is a front view showing a power transferring member mounted on a slider according to an embodiment of the invention.

The power transferring member 40 having the foregoing construction is assembled to the mounting unit 21a of the slider 21 in a movable manner. For that purpose, the mounting unit 21a has a through groove 24 for receiving and supporting the first axis 43 and a slit groove 25 for receiving and supporting the second axis 45. The first axis 43 fit into the through groove 24 allows for moving up, down, right and left due to the conical shape. The power transferring member 40 is connected to the lead screw 30 after having been rotated at or about 90 degrees after fit into the through groove 24 and the slit groove 25 in the first direction "A." FIG. 5 shows the power transferring member 40 having been fit in the first direction "A." FIG. 3 shows the power transferring member 40 after it has been rotated 90 degrees after being fit in the first direction "A."

Figure 6A:
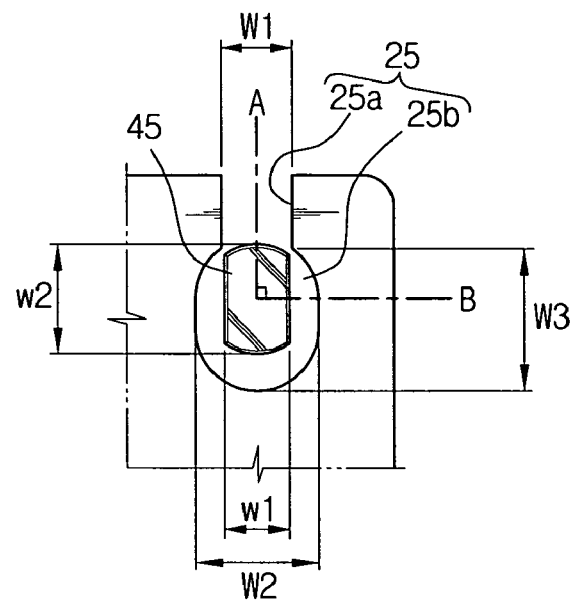
FIG. 6A is a drawing showing a portion of FIG. 5.

Referring to FIG. 6A, the slit groove 25 is divided into a first slit part 25a and a second slit part 25b. The first slit part 25a is formed for being opened in the first direction "A" and has a width W1 that corresponds to the short width w1 of the second axis 45 with respect to the second direction "B" perpendicular to the first direction "A." As the second axis 45 is joined by passing through the first slit part 25a through the short width w1, the short width w1 is formed smaller than the width W1 of the first slit part 25a.

Figure 6B:
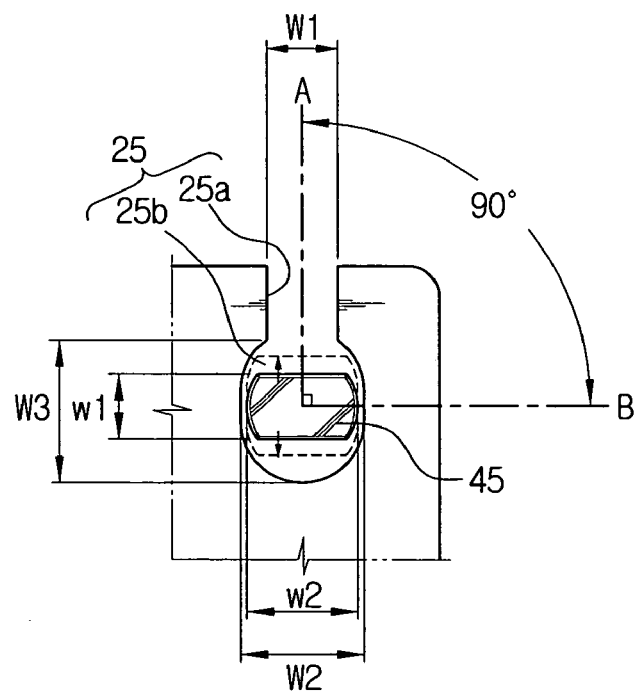
FIG. 6B is a drawing schematically showing a second axis rotated 90 degree from of the portion illustrated in FIG. 6A.

The second slit part 25b is connected with the first slit part 25a and extended further to the first direction "A." Such second slit part 25b, as shown in FIG. 6B, has a first width W2 that corresponds to the long width w2 of the second axis 45. Preferably, the first width W2 of the second slit part 25b is formed larger than the long width w2. Also, the second slit part 25b is formed to have a second width W3 that is naturally larger than the short width w1 in the first direction "A." Therefore, if the second axis 45 is rotated at or about 90 degrees after being fit into the second slit part 25b in the first direction "A" through the first slit part 25a, the long width w2 of the second axis 45 becomes perpendicular to the first slit part 25a, as shown in FIG. 6B, so that the second axis 45 can not be moved through the first slit part 25a. Also, the second axis 45 preferably has a degree of freedom at the second slit part 25b, of being movable a predetermined distance in the first direction "A." Namely, as the short width w1 of the second axis 45 is smaller than the second width W3 of the second slit part 25b in the first direction "A," the second axis 45 could be moved a predetermined distance in the first direction "A" as shown in dashed lines in FIG. 6B. Therefore, the second axis 45 of the power transferring member 40 is able to be position-adjusted with respect to the first direction "A." As a result, the position of the power transferring member 40 can be adjusted.

Upon assembling of the power transferring member 40 to the mounting unit 21a, a spring 50 is additionally provided. The spring 50 fits into the second axis 45, and applies pressure on the power transferring unit 40 toward the side of the through groove 24. Therefore, the first axis 43 has a degree of freedom with respect to external force while remaining fit in the through groove 24.

In an apparatus for driving a lens having the foregoing construction, the power transferring member 40 can be assembled to flexibly cope with assembly or manufacturing error of the lead screw 30. More specifically, the power transferring member 40 at its height, can deliver power within a predetermined distance in the up and down directions with the lead screw 30 fit in its U-shaped groove by the U-shaped structure of the tooth-shaped part 41.

Also, the first axis 43 is formed in a conical shape. Thus, fine adjustment for a constant height or twisted angel is possible in the event that the first axis 43 is pushed back by a load of an assembly error.

Also, the second axis 25 is able to be fine-adjusted in the first direction "A" at the second slit part 25b. Thus, in case the lead screw 30 and the power transferring member 40 are assembled in a non-parallel state with respect to each other, the second axis 25 has a degree of freedom to sufficiently compensate for the non-parallel state.

As is apparent from the foregoing, according to an embodiment of the present invention for driving a lens in a camera, the power transferring member for connecting the lens module to the lead screw has a degree of freedom by which fine position change is possible with respect to many directions.

Advantageously, a frictional load generated between the power transferring member and the lead screw due to assembly and manufacturing errors of the lead screw can be reduced. Power consumption of the driving motor can be minimized and noise due to friction can also be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for driving a lens in a camera comprising:
a lens module slidably installed in a lens barrel;
a lead screw rotatably installed in the lens barrel;

a power transferring member assembled on the lens module, wherein said power transferring member comprises a tooth shaped part corresponding to a shape of said lead screw, and wherein said lens module comprises a mounting unit adapted to movably receive the power transferring member, said power transferring member having a first orientation in which said power transferring member is removable from said mounting unit and a second orientation in which said power transferring member is not removable from said mounting unit.

2. The apparatus of claim 1, further comprising a driving motor, wherein said lead screw is adapted to be rotated by the driving motor.

3. The apparatus of claim 1, wherein the mounting unit comprises a through groove adapted to receive a first end of the power transferring member.

4. The apparatus of claim 3, wherein said first end of the power transferring member is conical.

5. The apparatus of claim 1, wherein the mounting unit comprises a slit groove adapted to receive a second end of the power transferring member.

6. The apparatus of claim 5, wherein said second end of the power transferring member is movable in a direction perpendicular to a sliding direction of the lens module.

7. The apparatus of claim 5, wherein said slit groove has a first slit part and a second slit part, the first slit part having a width smaller than a width of the second slit part.

8. The apparatus of claim 7, wherein said second end of the power transferring member has a cross section having a first width corresponding to the width of the first slit part, and a second width corresponding to the width of the second slit part.

9. The apparatus of claim 8, wherein said power transferring member is rotatable about a longitudinal axis such that in the first orientation said second end is movable through said first slit part, and in the second orientation said second end is not movable through said first slit part.

10. The apparatus of claim 1, wherein said mounting unit is integrally formed with a slider connected to the lens module.

11. The apparatus of claim 1, wherein an object lens and a barrel cover are disposed at one end of the lens barrel.

* * * * *